United States Patent Office 2,709,045
Patented May 24, 1955

2,709,045

PROCESS OF MANUFACTURING CELLULOSE POWDER

Gerardus Arnoldus Demon, Huissen, and Lodewijk Carel van der Ven and Jouke Andriessen, Arnhem, Netherlands, assignors, by mesne assignments, to N. V. Onderzoekingsinstituut Research, Arnhem, Netherlands, a corporation of the Netherlands No Drawing. Application May 9, 1951,
Serial No. 225,458

Claims priority, application Netherlands June 6, 1950

1 Claim. (Cl. 241—3)

The present invention relates to the manufacture of cellulose powder, and more particularly, it relates to a process for preparing cellulose flakes from cellulose usually in sheet form and converting the flakes into powder.

Pulverized cellulose particles are useful for preparing chemical compounds of cellulose, such as cellulose ethers, cellulose esters, and cellulose xanthogenate. The cellulose powder also finds application in such uses as a filter medium, an additive for paints, varnishes, and the like and as a filler for articles made from artificial resins.

It is an object of this invention to provide an improved form of a cellulose flake and a cellulose powder.

It is a further object of this invention to provide an improved process for the manufacture of cellulose flakes and powders.

These objects are accomplished in general by subjecting an air-dry cellulose sheet, such as is used in the rayon industry, to a treatment which may be termed "frictionation," whereby the cellulose sheet is passed through a pair of pressure rolls, rotating at different peripheral velocities and separated by a distance smaller than the thickness of the sheet. This imposes a combined compressive and frictional force on the cellulose which produces a glassy, brittle cellulose flake, which can be subsequently reduced to a fine powder in a milling device.

The details of the process of this invention will be more readily understood from the following description. The pressure rollers to be used in conjunction with this "frictionation" or flake-formation process can be those of a plasticizing machine, such as is well known in the rubber industry, and in which each roll can be driven at a different linear speed. The choice of apparatus is readily apparent to one skilled in the art and does not constitute a part of this invention per se.

The diameter of the rollers is of some importance, although this dimension is not critical. If the diameter is greater than 30 cm., frictionation does not occur as rapidly as it does with smaller rollers that have a greater curvature. Excellent results are obtained with a smaller roller, having a diameter of only 7 cm. An intermediate size, as for example, 15 cm. gives satisfactory results.

The R. P. M. of the faster roll is chosen to give a linear velocity of about 12 meters per minute or less. Of course, a greater R. P. M. is required with a smaller roll to give the same peripheral speed. For example, a 30 cm. roll, rotating at 12 R. P. M., gives a linear speed of slightly less than 12 meters per minute. Approximately the same linear speed is obtained with a 15 cm. roll rotating at 25 R. P. M. The linear speed can be less, as for example, a 7 cm. roll, rotating at 25 R. P. M., gives extremely satisfactory results at a linear speed of about 5.5 meters per minute.

The difference between the linear speeds of the two rollers may be expressed as the ratio of the speed of the faster roll to that of the slower roll. Preferable ratios lie in the range of 1.20–1.40.

The distance between the closest surfaces of the pair of rollers is adjusted to give a gap considerably smaller than the thickness of the sheet of cellulose and less than 0.05 mm., preferably less than 0.02 mm.

The cellulose used in this process is preferably in sheet form, either in individual sheets or in a continuous strip, and has a thickness preferably between 0.5 and 3.0 mm.

The moisture content of the cellulose being thus treated is important. Moisture contents of 10–15%, based on bone dry cellulose, give excellent results, with higher contents giving less satisfactory results and requiring greater lengths of treatment time. The upper moisture limit apparently depends on the amount of colloidally absorbed water, which is approximately 35%. Above this value, the frictionation will not take place.

In operation, the cellulose sheet is advanced into the gap between the pair of rolls. As it passes through this gap between the closest parts of the pair of rolls, extremely high pressures are developed on the cellulose for a momentary period. Although it is difficult to estimate the exact pressure because of the convergence of the curved surfaces of the two rolls, it is probable that at the narrowest part the pressure is at least 2000 kilograms per square centimeter.

In addition to the compressive force, applied in this manner, a rubbing or frictional force is exerted upon the cellulose sheet as a result of the differential in linear speed of the two rolls. This combination of squeezing and rubbing makes the cellulose become more brittle, glassy, and hard.

This frictionation is then repeated several times in the same manner, with the physical character of the sheet changing after each operation. After each successive treatment, the compressive force has an increasing "cracking" action as well as a crushing action. After three or four such frictionations, the sheet is radically different from the untreated material, and the thus frictionated material shatters and breaks up into small flakes, thereby losing all traces of the original sheet form. These flakes are very brittle, hard, and glassy, and can be removed from the last pressure roll by a suitable scraping device.

The frictionation can be repeated by using the same pair of rolls, passing the sheet successively through this pair. This method is satisfactory when treating individual sheets of cellulose. If the cellulose is supplied in a continuous strip, it is preferable to provide a series of pairs of rolls. In such a case, it is desirable to reduce the gap between the rolls with each successive pair.

Frictionations have been carried out by passing two sheets at a time one on top of the other, through the rolls, but it is more satisfactory to treat only one sheet at a time.

Obviously, the number of pairs of rolls and the amount of time required to convert the sheet cellulose to the flake cellulose depends on the dimensions and speeds of the rolls, the size of the gap between the rolls, the cellulose sheet thickness, the moisture content of the cellulose, the temperature of the rolls, and the like.

The mechanical working of the cellulose sheet during this frictionation generates a substantial amount of heat. To prevent this heat from raising the temperature of the rolls too high, it is desirable to provide means for cooling the rolls, such as a cool water circulating system. One advantage of using warm rolls is that the heat evaporates some of the moisture present in the cellulose, thereby enabling the frictionation to be carried out more easily.

It is difficult to measure the increase of the temperature of the cellulose as a result of this frictionation. The rolls are usually cooled below room temperature, and preferably maintained at 12°–13° C. At this temperature, the flakes which are scraped from the last roll are warm to the touch, and thus are approximately 30° above the roll temperature.

It has been determined, contrary to expectation, that if the size of the gap is increased, there is a greater rise in temperature, and in that case, the cellulose assumes a glossy appearance, probably as a result of too much frictional rubbing and too little cracking.

During the physical change from sheet cellulose to flake cellulose a chemical change takes place in the molecular configuration of the cellulose. As a combined result of the mechanical working and the somewhat elevated temperature, some decrease in the degree of polymerization of the cellulose and a change in the X-ray diagram are encountered. The actual decrease in the degree of polymerization is dependent on the duration of the frictionation, the temperature of the rolls, and the amount of work done on the cellulose during frictionation.

It is, of course, well known that cellulose will show a decrease of its degree of polymerization when subjected to mechanical working. In fact, this is a disadvantage to many of the earlier processes for pulverizing cellulose, such as the method for dry grinding cellulose in a ball mill described in United States Patent No. 1,910,406, as well as the wet grinding processes described in United States Patents Nos. 1,936,843 and 2,229,142. In such processes, the degree of polymerization may be reduced to such an extent that the cellulose cannot be successfully employed in chemical operations, although it can be used as a filler for resins, etc. Still another disadvantage flowing from the earlier processes is the uneven reduction in the degree of polymerization.

The present invention overcomes both of these problems by giving only a small and uniform reduction in the degree of polymerization. Furthermore, it is very simple to control the extent of this reduction.

Once the cellulose flakes have been obtained by this air-dry frictionation, the process of converting them to a cellulose powder is relatively simple, for the flakes, being brittle, hard, and glassy, are rapidly and easily pulverized while still dry in a milling machine, such as a cross-beater mill or hammer mill. Indeed, a process such as the pulverization of dry cellulose in a ball mill described in the aforesaid United States Patent No. 1,910,406 can be used to advantage. In said patent, however, the starting material is the untreated cellulose, and the product is a powder that is not homogeneous and must be sieved. In comparison with this particular patented process, the process of the instant invention requires a much shorter time, often only 1/20 of the time to grind untreated cellulose, consumes less power, and gives a homogeneous powder that forms a cone-shaped heap when poured in the same fashion as fine sand. The powder is completely free from fibers.

In addition to the above advantage of yielding a homogeneous product, this process takes place very rapidly, often in a fraction of a minute, thereby representing a sizeable economy over the previously known methods. The frictionation operation can be carried out in less than a minute, while the pulverizing operation also takes place in a very short time as a result of the brittleness of the flake.

The following example will illustrate one embodiment of the invention of this process:

*Example*

Sheets of wood cellulose of the type known in the rayon industry with a dimension of 10 x 20 cm. and a weight of 10 grams were passed through the slit of two axially spaced rollers. For this purpose a roller set-up used for plasticizing rubber was employed. The diameter of each of the rollers was 7 cm. The top roller made 23 revolutions/minute and the lower roller 18 revolutions/minute. The linear speeds of the two rollers accordingly were 5.06 and 3.96 meters per minute, corresponding to a difference of 28%. The width of the slit amounted to 0.01 mm. The moisture content of the cellulose amounted to 9% and the time required for obtaining a good brittle product amounted to 10 seconds per sheet, each weighing 10 g. During the treatment the rollers were cooled with water maintained at 13° C. The work required was 200 watts per kilogram of cellulose.

After the "frictionation" the degree of polymerization had decreased from 900 to 750. The material obtained easily broke up into flakes, which could be very rapidly milled to powder in a cross beater mill.

When processing linters it appeared that after a treatment of 4 seconds the degree of polymerization had decreased from 1800 to 1625 and after 8 seconds from 1800 to 1400.

The materials obtained by the process of this invention, including the flakes but especially the powders, as stated above, have a higher degree of polymerization than cellulose powders obtained formerly, and accordingly are especially suitable as the starting material in the manufacture of cellulose ethers, such as carboxymethylcellulose, cellulose esters, such as cellulose acetate, and cellulose xanthate. In such applications, the cellulose flakes or powder can be mixed with the various chemicals, in the required sequence, and various operations can subsequently be omitted, as for example, the pressing of the soaked material which is necessary if the material is used in its customary form. During such treatments, the cellulose flakes or powder do not agglomerate.

The powder obtained by this process can also be used as a filter medium, not only for separating liquids and solids, but also for retaining smoke or mist. Also, the powder can be used as an additive to paints, varnishes, lacquers and the like, or as a filler in the manufacture of articles.

The form of cellulose used in this process is not limited to sheets or long strips, for even linters or wood cellulose in flake form can be used. Further, the cellulose itself can be derived from cotton linters, woodpulp or from fibers such as flax, ramie, and hemp, and the like.

Where the terms "dry" and "air-dry" cellulose are used in the specification and claim, this is intended to cover cellulose having a moisture content from 9 to 15%.

What is claimed is:

A process for the manufacture of finely divided cellulose powder which comprises passing a sheet of cellulose of 0.5–3.0 mm. thickness, having a moisture content less than 15%, through a dry processing zone comprising four pairs of rotating cylindrical rolls maintained at about 13° C., the gap between each pair of said rolls being less than 0.05 mm. and decreasing successively with each pair of rolls, the two rolls in each pair rotating to give different peripheral velocities, the ratio of the faster roll velocity to the slower roll velocity being 1.2–1.4, whereby the sheet is subjected to a combined compressive and frictional rubbing force sufficient to cause said sheet to break into brittle, glassy, hard flakes, removing said flakes from said processing zone, and milling said flakes to a fine powder.

References Cited in the file of this patent

UNITED STATES PATENTS

| | | |
|---|---|---|
| 114,303 | Kimball | May 2, 1871 |
| 201,083 | Allen | Mar. 12, 1878 |
| 417,282 | Reed | Dec. 17, 1889 |
| 420,447 | France | Feb. 4, 1890 |
| 1,714,261 | Egan | May 21, 1929 |
| 1,851,008 | Hanson et al. | Mar. 29, 1932 |
| 1,880,045 | Rechter | Sept. 27, 1932 |
| 2,014,074 | Sheppard et al. | Sept. 10, 1936 |

(Other references on following page)

UNITED STATES PATENTS

| | | | |
|---|---|---|---|
| 2,118,763 | Mason | May 24, | 1938 |
| 2,130,566 | Schmidt | Sept. 20, | 1938 |
| 2,233,200 | Meyer | June 30, | 1942 |
| 2,331,865 | Swinehart et al. | Oct. 12, | 1943 |
| 2,362,528 | Balz | Nov. 14, | 1944 |
| 2,538,086 | Dennison | Jan. 16, | 1951 |
| 2,575,744 | Burt | Nov. 20, | 1951 |
| 2,618,018 | Downing et al. | Nov. 18, | 1952 |
| 2,663,907 | Downing et al. | Dec. 29, | 1953 |

FOREIGN PATENTS

| | | |
|---|---|---|
| 495,173 | Great Britain | of 1938 |

OTHER REFERENCES

Partial Pyrolysis of Wood, by Robert W. Merritt and Alfred A White, in Industrial and Engineering Chemistry, volume 35, Number 3, March 1943, pages 297–301. Photostat in 202–9.